United States Patent [19]
Bobylev et al.

[11] 3,938,787
[45] Feb. 17, 1976

[54] APPARATUS FOR MIXING AND GRANULATING BULK MATERIALS

[76] Inventors: Vitaly Petrovich Bobylev, ulitsa Naberezhnaya imeni Lenina, 120, kv. 7; Alexandr Feodosievich Kravtsov, ulitsa Pisarzhevskogo, 6a, kv. 6, both of Dnepropetrovsk; Vitaly Nikolaevich Bytkin, prospekt Lenina, 234, kv. 32; Ruvim Semenovich Bershtein, prospekt Metallurgov, 22, kv. 58, both of Zaporozhie, all of U.S.S.R.

[22] Filed: Dec. 31, 1974

[21] Appl. No.: 537,772

[30] Foreign Application Priority Data
Jan. 3, 1974  U.S.S.R............................ 1981783

[52] U.S. Cl......................... 259/177 R; 259/178 A
[51] Int. Cl.²........................................... B28C 5/18
[58] Field of Search .......... 259/173, 174, 175, 176, 259/177 R, 178 R, 178 A, 161, 146, 148, 14, 15, 16, 30, 31, 32, 33, 81 R

[56] References Cited
UNITED STATES PATENTS

| | | | |
|---|---|---|---|
| 1,447,125 | 2/1923 | Dunn................................ | 259/174 |
| 3,109,632 | 11/1963 | Wiegel.............................. | 259/175 |
| 3,690,622 | 9/1972 | Brunner............................ | 259/174 |
| 3,727,894 | 4/1973 | Kurt................................. | 259/174 |

*Primary Examiner*—Robert W. Jenkins
*Attorney, Agent, or Firm*—Holman & Stern

[57] ABSTRACT

The apparatus is provided with a bowl rotatable about a vertical axis and accommodating therein two groups of vanes fixedly secured on a portion of a framework, overlying the bowl. The vanes adjoining the discharge opening of a bowl curve arcuately in longitudinal and transverse directions, each having its side which is convex in the longitudinal direction and concave in the transverse direction facing the direction of rotation of the bowl. The vanes adjoining the peripheral wall of the bowl are defined by several steps arranged in the horizontal direction and having their concave sides facing the rotation of the bowl, with the sides curving arcuately in a transverse direction. A discharge blade has its side which is concave in the longitudinal and transverse directions facing the rotation of the bowl and jointly with the vertically reciprocable vane spans the space between the peripheral wall of the bowl and the discharge opening.

4 Claims, 4 Drawing Figures

APPARATUS FOR MIXING AND GRANULATING BULK MATERIALS

BACKGROUND OF THE INVENTION

The present invention relates to apparatus for mixing and granulating bulk materials, such as agglomerated blast furnace charges and can be employed in the manufacture of various granules, e.g. ore pellets, in various industries in which bulk materials are to be mixed and granulated, for instance, for subsequent conveying.

PRIOR ART

At present, various rotary drum and bowl type apparatus are widely used for mixing and granulating bulk materials. The mixing and granulating apparatus of the prior art differ both in their operation principle and design.

Among them definite advantages are offered by a recirculation type apparatus for mixing and granulating blast furnace charge, disclosed in USSR Inventor's Certificate No. 405,668. This apparatus includes a bowl mounted for rotation about a vertical axis on a stationary framework, with the bowl having the area where the material to be treated is charged thereinto, adjacent to the peripheral wall thereof and a discharge opening or outlet in the central bottom part thereof.

The portion of the framework, overlying the bowl, has mounted thereon a plurality of vanes, each having a rectilinear longitudinal axis and arcuate cross-section. Each blade has its concave side in the transverse direction facing in a direction opposing that of rotation of the bowl. There are also mounted on the portion of the framework, a discharge blade and means for feeding liquid binding agent into the bowl. The vanes and the delivery blade have minimal clearance from the bottom and from the peripheral wall of the bowl. One group of the vanes is positioned adjacent to the discharge opening of the bowl, with each vane having one of its end facing this opening.

Another group of the vanes is positioned at the peripheral wall of the bowl, with each vane of this group having one of its end facing this wall. The opposite ends of the vanes are positioned so that all the vanes act as guides for the material being treated and upon rotation of the bowl repeatedly and successively direct the material from the vane of one group onto the successive vane of the other group. Consequently, the material being treated is granulated by the action of its swirl-like flow toward the discharge blade. The latter completely spans the space between the peripheral wall of the bowl and the discharge opening. The blade is associated with a drive effecting its vertical reciprocation, and the bowl is associated with a drive effecting its rotation about the vertical axis. The liquid binding agent is fed into the stream of the material in front of the vanes of the first group, with each vane of this group adjoining the discharge opening of the bowl.

The above described apparatus of the prior art operates, as follows:

A material to be granulated is fed through the charging port in the upper portion of the framework upon the bottom of the bowl at the peripheral wall thereof. The granulation of the bulk material is caused by its intense rolling along the work surfaces of the vanes which have a profile which is curvilinear in a tranverse direction. A portion of the liquid binding agent is fed onto the material in front of each granulating vane.

However, experience has shown that the operation of the above described prior art apparatus involves certain difficulties. The moistened material displays a tendency to stick to the vanes, which not only affects the quality of the granulation, but might lead to hanging of the material being treated in the apparatus. The dangerous accumulation of the material being treated in such apparatus can be prevented by stepping up the speed of rotation of the bowl, but this has been found to curtail the time during which the material is processed by the apparatus at the work surfaces of the granulating vanes adjoining the peripheral wall of the bowl, and thus affects the quality of the granulation.

Furthermore, the vertical reciprocation of the discharge blade is liable to result, on the one hand, in the destruction of already shaped granules, as the latter are engaged by the pointed edge of the blade, and, on the other hand, in the appearance of unwanted oversized granules that may pass under the raised blade.

The final granulated material is directed by the discharge blade toward the discharge opening. While the blade is raised, a portion of the material is able to pass thereunder and mix with the material fed into the bowl by the feeding means. Thus, there is established a recirculation stream which has been found to intensify the mixing operation. i.e. to yield a highly homogeneous mixture of the bulk material.

The design of the above described prior art apparatus ensures that the apparatus can be successfully used for mixing relatively dry bulk materials.

However, the efficiency of such apparatus becomes considerably lower, when it is used as a granulator, particularly, as a granulator of a relatively damp blast furnace charge.

The experience and the research conducted by the present applicants have shown that the difficulties involved in operation of the apparatus of the prior art are caused by the shape of the granulating vanes and of the discharge blade as well as certain design features of this apparatus. Thus, the rectilinear shape in the longitudinal direction axis of the vanes adjoining the discharge opening of the bowl promotes an unwanted accumulation of the material being treated at the work surfaces of the vanes. While the same shape of the vanes adjoining the peripheral wall of the bowl accelerates the exit of the material from the work surfaces of these last-mentioned vanes, which has been found to affect the quality of the final product and the performance of the apparatus.

The applicants have also discovered certain negative phenomena connected with the operation of the discharge blade.

It has been established that while the material moves along the discharge blade, already lumped particles of the material roll off the work surface of the blade and are directed for repeated granulation, which might lead to the formation of oversize granules, as well as in the destruction of granules of a proper size, as they pass under the pointed edge of the discharge blade.

The above shortcomings of the prior art apparatus result in its relatively low productivity and, which is even more important, in its being incapable of delivering a quality product in terms of homogeneity and gas permeability of the layer of agglomerate. These shortcomings of the above described apparatus, which are also found in other commonly known granulators of the drum and bowl types, become particularly pronounced in the manufacture of an agglomerated blast furnace charge, in which the quality of the agglomerated charge prepared for sintering predetermines both the productivity of the sintering machines and the metallurgical worth of the agglomerate. Consequently, the shortcomings of the apparatus employed for mixing and granulating become of great significance, since they constrain the growth of productivity of sintering machines and improvement of the quality of agglomerate.

Therefore, the provision of an apparatus enabling to control actively the properties of an agglomerated blast furnace charge in the process of its mixing and granulating has become a task of top priority, considering the decisive role it plays in the advance of the art of preparing raw materials for metallurgical processes having specified properties.

OBJECTS AND SUMMARY OF THE INVENTION

It is the main object of the present invention to provide an apparatus for mixing and granulating bulk materials, which delivers a product of high homogeneity in terms of granule size, providing for improved gas permeability of subsequently sintered layers of the material.

It is an equally important object of the present invention to step up the productivity of the apparatus of the specified type.

It is a further object of the present invention to increase the strength of the granules produced.

These and other objects are attained in an apparatus for mixing and granulating bulk materials, comprising a bowl mounted on a framework for rotation about a vertical axis, the bowl having an area in which a material to be treated is loaded thereinto, adjacent to a peripheral wall thereof, and a discharge opening at the center of a bottom thereof, a portion of the framework, overlying the bowl, having mounted thereon to reach into the bowl, a discharge blade, a device for feeding a liquid binding agent into the bowl and two groups of vanes, each vane being arcuately curved in a transverse direction and having its concave side in the transverse direction facing in a direction opposite to that of rotation of the bowl, each vane of the first group having one its end adjoining the discharge opening of the bowl and each vane of the second group having one of its ends adjoining the peripheral wall of the bowl, each vane of either one of the two groups being positioned to act as a guide for the material being treated, directing it onto the corresponding vane of the other group, as the material is being advanced by rotation of the bowl, in which apparatus, in accordance with the present invention, each vane adjoining the discharge opening of the bowl curves arcuately in a longitudinal direction and has its side which a convex in the longitudinal direction and concave in the transverse direction facing in a direction which is opposite to that of rotation of the bowl each vane adjoining the peripheral wall of the bowl being, defined by at least two arcuately curving in the transverse direction, arranged in the horizontal direction and skewing in the direction of rotation of the bowl to form an acute angle with a radius extending from the center of the bottom of the bowl to the end of this stepped vane, adjoining the peripheral wall of the bowl, that one of the stepped vanes, which is the most remote one in the direction of rotation of the bowl from the area of charging of the material, extending relative to the discharge blade so that this last-mentioned vane, together with the discharge blade, are spanning the space between the peripheral wall of the bowl and the discharge opening in the bowl.

The vane which curves in the longitudinal direction and has its convex side in the longitudinal direction facing the rotation of the bowl, and, consequently, facing the flow of the material being treated, has no material sticking thereto, since the latter slips off its surface.

The stepped shape of the vanes provides for intensification of the process of exerting dynamic action upon the particles of the material, as a result of a repeated transfer of the particles of the material from one step to the successive one, which yields increased strength of the granules produced. It is known that increased strength of the granules prevents their untimely destruction at handling and conveying, which is of particular consequence in cases in which the material being treated is either a blast furnace charge or some other material which is to undergo subsequent handling and transportation.

An advantage of the stepped vanes over straight ones is the fact that they prolong the path of the particles along the work surfaces of the vanes and, which is also very important, prolong the time of contact of the material with the vanes.

It is expedient that the stepped vane which is the most remote one from the area of charging of the material be mounted for vertical reciprocation and associated with a drive for effecting such vertical reciprocation.

The vertical adjustment of this last-mentioned vane provides for controlling the level of the material passing under this vane in the bowl of the apparatus without altering the speed of this rotation. This is highly advantageous, since it enables to direct a pre-determined portion of the material to repeated mixing and granulation, which, in turn, enables to attain higher homogeneity of the product in terms of the size of the granules and the chemical-mineralogical composition.

Another advantage offered by this feature is the fact that the portion of the material, engaging the work surface of the vane, is additionally granulated and directed onto the discharge blade, there being prevented access to the blade of eversize particles, because in the stream or in the layer of the material, the larger particles are in the higher portion of this stream, if viewed in cross-section. The provision of the drive effecting vertical reciprocatory adjustment of the vane offers mechanization of the operation of adjusting the the volume of the streams directed, respectively, to recirculation and discharge.

It is further expedient that each stepped vane extends at an angle within a range from 40° to 50° relative to the respective radius of the circle of the bowl. This can be explained by the fact that should the angle be in excess of 50°, the resistance exerted by the vanes to the flow of the material would rise considerably and result in an accumulation of the particles of the material at the vanes, and this would promote the phenomenon of sticking of the particles to the work surface of the vane, which is extremely undesirable.

Should this angle be substantially short of 40°, the time of contact of the material being treated with the work surfaces of the vane would be insufficient to convert the particles to the state of granules. In addition, a smaller angle (i.e. one substantially short of 40°) makes it impossible to increase the strength of the granules, due to their motion along the work surfaces of the vanes.

The range of 40° to 50° has been found to be the optimal one from the point of view of maximum utilization of the granulating properties of the vanes.

It is also expedient that the discharge blade be curved arcuately in the longitudinal and transverse directions, the side which is concave in the longitudinal and transverse directions facing the rotation of the bowl, with the clearance between the bottom edge of the blade and the bottom of the bowl being minimal.

This shape and arrangement of the discharge blade prevents passage of lumped particles or granules of the material being treated under the discharge blade and provides for unobstructed progress of the granules of the material along the blade surface toward the discharge opening in the bottom of the bowl. The arcuate shape of the discharge blade in the longitudinal and transverse directions ensures additional rolling of the particles of the material along the concave surface, which steps up the quality of the product by additionally strengthening the granules.

With the above specified vane being vertically adjustable and the discharge blade being stationary, there is prevented breakage of the particles of the material which have acquired the specified size in the process of mixing and granulation.

The present invention will be further described in connection with embodiments thereof, with reference being had to the accompanying set of drawings, wherein:

DETAILED DESCRIPTION OF THE INVENTION

Figure 1:
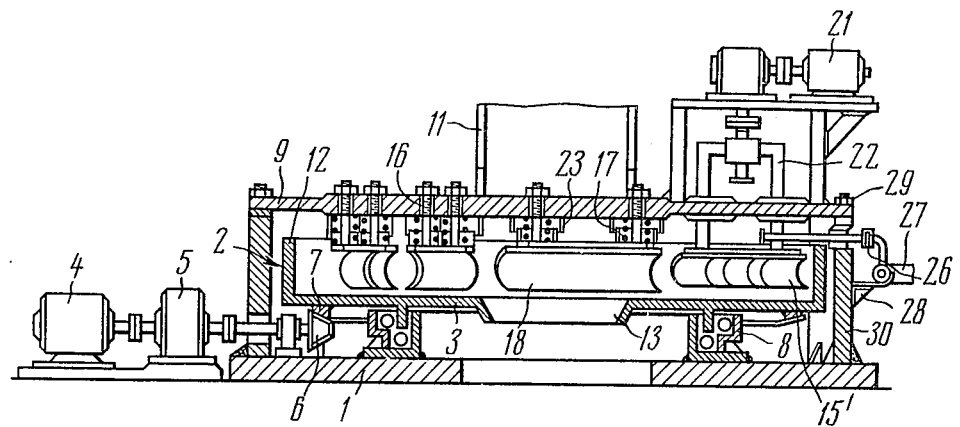
FIG. 1 is a vertically sectional view along the longitudinal axis of an apparatus embodying the invention.
Figure 2:
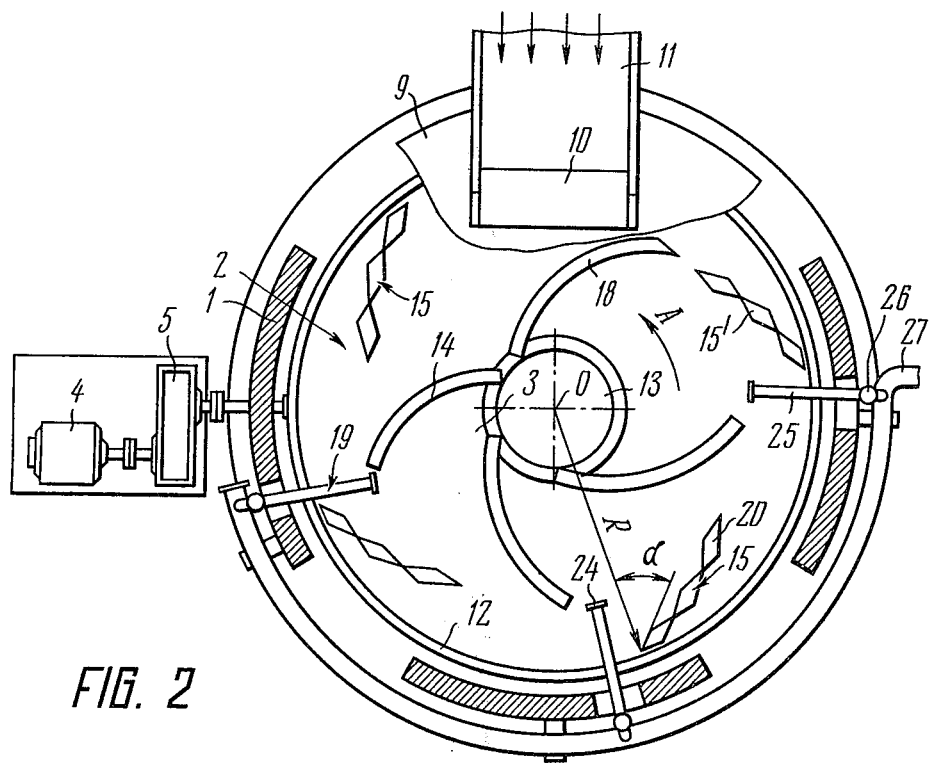
FIG. 2 is a plan view of the bowl of the apparatus, partly broken away in the area of charging the material into the bowl.

In the drawings, the apparatus for mixing and granulating bulk materials includes a framework 1 (FIG. 2) having mounted thereon a bowl 2 rotatable about a vertical axis extending through a centre (*O*) of a bottom 3 of the bowl 2. Rotation of the bowl 2 is effected by a drive 4 including an electric motor and a reducer 5 coupled to the motor and to a bevel gear 6 (FIG. 1) meshing with a toothed rim 7 of the bowl 2, with the latter being journalled for rotation in antifriction bearings 8. Overlying the bowl 2 is a portion 9 of the framework 1, in the form of a lid having an opening or port 10 (FIG. 2) through which a bulk material to be treated can be fed from an outlet 11 of a charging device into the area of the bowl 2, adjoining a peripheral wall 12 thereof.

The central portion of the bottom 3 of the bowl 2 has a discharge opening 13 provided therethrough.

Accommodated within the bowl 2 (FIG. 1) adjacent to the bottom 3 thereof are two groups of vanes 14 and 15 which are mounted with the help of posts 16 and springs 17 on the upper portion 9 of the framework 1, overlying the bowl 2. A discharge scraper blade 18 is mounted in a similar manner.

A liquid binding agent can be fed into the bowl 2 (FIG. 2) by a device 19 likewise mounted on the portion 9 of the framework 1, overlying the bowl 2.

The vanes 14 and 15 curve arcuately in a transverse direction and have their side which is concave in this transverse direction facing in a direction opposite to that (indicated with arrow A) of rotation of the bowl 2.

Figure 3:
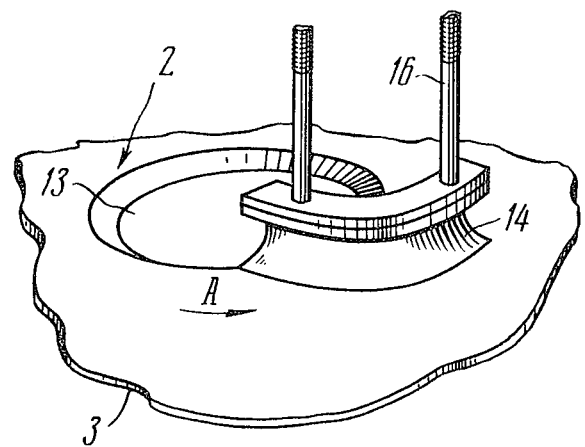
FIG. 3 is a fragmentary perspective enlarged view of a vane adjoining the discharge opening in the bottom of the bowl.
Figure 4:
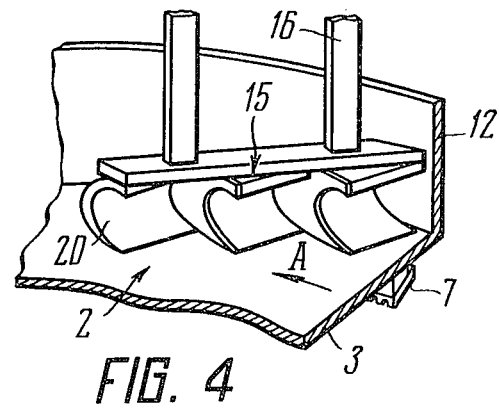
FIG. 4 is a fragmentary perspective enlarged view of a vane adjoining the peripheral wall of the bowl.

Besides, each vane 14 (FIG. 3), has one of its end adjoining the discharge opening 13 of the bowl 2, while each vane 15 (FIG. 4) has one of its ends adjoining the peripheral wall 12 of the bowl 2. With respect to the annular surface of the bottom 3 of the bowl 2, the vanes 14 and 15 (FIG. 2) of both groups are arranged so that each vane 14 of one group serves as a guide directing the material advanced by the bottom 3 of the rotating bowl 2 toward the corresponding vane 15 of the other group, adjoining the peripheral wall 12 of the bowl 2. Similarly, each vane 15 serves as a guide directing the material onto the successive vane 14.

Each vane 14 (FIG. 3) situated at the discharge opening 13 of the bowl 2 curves arcuately in the longitudinal direction and has its side which is convex in the longitudinal direction and concave in the transverse direction facing the rotation of the bowl 2 (the direction of rotation being indicated with arrow A). Each vane 15 (FIG. 4) adjoining the peripheral wall 12 of the bowl 2 is defined by at least two steps or sections 20 curved arcuately in the transverse direction and arranged in a stepwise fashion in the horizontal direction. Furthermore, each vane 15 (FIG. 2) is skewing in the direction of rotation of the bowl 2 so that it forms an acute angle ($\alpha$) with a radius (R) extending from the center (*o*) of the bottom 3 of the bowl 2 to the end of this stepped vane 12, adjoining the peripheral wall 12 of the bowl 2. This angle is preferably within a range from 40° to 50°.

A stepped vane 15' which is the most remote one in the direction of rotation of the bowl 2 from the area where a material is charged thereinto is so arranged with respect to the discharge blade 18 that they jointly span the space between the peripheral wall 12 of the bowl 2 and the discharge opening 13 in the bottom 3 thereof. The length of the discharge blade 18 can span one half of this space.

The discharge blade 18 is curved arcuately in the longitudinal and transverse directions and has its side which is concave in the longitudinal and transverse directions facing in a direction opposite to that of rotation of the bowl 2, with the discharge blade being positioned so that the clearance between the bottom edge thereof and the bottom 3 of the bowl 2 is minimal. The vane 15' is mounted on the portion 9 (FIG. 1) of the framework 1, overlying the bowl 2, for vertical reciprocatory adjustment and which latter adjustment is effected with the help of an actuator 21. The actuator 21 is operably connected with an n-shaped frame 22 supporting the vane 15'.

The delivery blade 18 and the vanes 14 and 15 can be provided in the areas of their moutnig with telescopic casings enveloping the springs 17 received about the posts 16.

Each step 20 (FIG. 2) of the blade 15 extends with respect to the radius (R) of the bottom 3 of the bowl 2 at an acute angle within a range from 40° to 50°. So as not to oppose the rotation of the bowl 2, the delivery blade 18 and the vanes 14 and 15 are spaced from the bottom 3 of the bowl and from the wall 12 thereof by appropriate small gaps or clearances.

Mounted in front of the stepped vanes 15 are spraying means 24 of the device 19 for feeding a liquid binding agent, supplied via their respective independent conduits 25 and associated with each is an independently adjustable tap valve 26 for controlling the feed of the agent.

The conduits 25 connect the respective spraying means 24 to a common supply conduit 27 which is supported on brackets 28 mounted on the vertical portions of the framework 1.

The upper portion of the framework 1 is mounted by means of bolted connections 29 on vertical portions 30 of this framework 1.

The present apparatus operates, as follows:

A material to be treated, i.e. mixed and granulated, is fed from the outlet 11 (FIGS. 1 and 2) through the port 10 in the upper portion 9 of the framework 1 onto the bottom 3 of the rotating bowl 2 (the direction of rotation is indicated in the drawings with the arrow A) and is advanced thereby toward the discharge blade 18.

As the material is being thus advanced, its particles roll along the curving surfaces of the vanes 14 and 15 (FIGS. 3 and 4) and are successively transferred from the vane 14 of one group onto the corresponding vane 15 (FIG. 2) of the other group and vice versa. While the material is being advanced, it is being sprayed with the liquid binding agent supplied through the spraying means 24 of the device 19, with the material being thus moistened, and the particles thereof intensely aggregating into lumps, i.e. granulating.

The stepped structure of the vanes 15 adjoining the peripheral wall 12 of the bowl 2 provides for intense formation of granules, due to the increased time of contact between the material being treated and the vanes 14 and 15. Furthermore, the stepped shape of the vanes and their arcuate shape in the transverse section ensure active strengthening of the granules formed.

The shape of the vanes 14 adjoining the discharge opening 13 and the arrangement thereof provide for a relatively unobstructed passage of the material being treated along the vanes 14 and 15 and prevent its accumulation, caused by either sticking or hanging, at the work surfaces of the vanes.

The stepped vane 15' positioned adjacent to the discharge blade 18 can be raised by the actuator 21 of the vertical adjustment mechanism above the bottom 3 of the bowl 2, thus ensuring a specified clearance or gap between the bottom edge of this vane and the surface of the bottom 3 of the bowl 2. Consequently, the initial stream of the material is divided into a recirculation stream passing under the bottom edge of the now raised vane 15' and a stream of granules directed by this vane toward the discharge blade 18 to be guided thereby into the discharge opening 13 to leave the apparatus. The volume of the recirculation stream is defined by the size of the gap between the bottom edge of the vane 15' and the bottom 3 of the bowl 2. This stream joins the stream fed from the outlet 11 through the port 10 into the bowl 2 of the apparatus and thus undergoes repeated granulation. It should be noted that the small-size granules which have passed through the above mentioned gap act as additional nuclei of the granulation of the material being treated, which has been found to intensify considerably the granulation process.

With the last-in-succession vane 15' being adjustable directly in the process of mixing and granulating, the process of granulation becomes controllable.

The possibility of having, in the apparatus, an internal controllable recirculation stream is a decisive feature ensuring formation of the final product having pre-selected specified physical and mechanical properties.

In addition to initiating the recirculation stream, the vertically adjustable stepped vane 15' shapes the stream of granules, directed to the discharged, by separating that portion of the material, which engages its surface and directing it toward the discharge blade 18. The material engaging the surface of the discharge blade 18 additionally rolls therealong and advances toward the discharge opening 13, i.e. to the exit from the apparatus.

With the discharge blade being fixedly mounted, there is prevented access of the granules to the space under the bottom edge of this blade and their resulting destruction, which in itself is a considerable advantage of the present apparatus over the similar apparatus of the prior art.

The applicants improved mixing and granulating apparatus precludes the sticking and accumulation of the particles of a blast furnace charge at the granulating vanes 14 adjoining the discharge opening 13.

This is attained due to the vanes being curved arcuately in the longitudinal direction and having their convex side in the longitudinal direction facing the direction of rotation of the bowl 2 and, hence, facing the stream of the material being treated and advanced thereupon. Furthermore, as compared with the apparatus of the prior art, the area of feeding the liquid binding agent has been transferred from the vanes 14 to the vanes 15 adjoining and peripheral wall 12 of the bowl 2.

In the present apparatus, the liquid binding agent, e.g. water is fed at the vicinity of the vanes 15 where higher radial speeds ensure that the moistened material leaves the vanes without sticking thereto. This is further ensured by the vanes being arranged at the peripheral wall 12 of the bowl 2 at an angle from 40° to 50° to the radial direction.

The apparatus solves the problem of preparing a quality blast furnace charge for sintering and has all the prerequisites for wide utilization.

Tests have shown that the apparatus improves the homogeneity of a blast furnace charge, as far as the granule size is concerned, and also improves the gas permeability of the charge, which steps up the productivity of sintering machines and at the same time improves the quality of the final product, i.e. of the agglomerate.

Comparatory tests carried out with a pilot model of the present apparatus have shown which the gas permeability of a sintered blast furnace charge that have been processed by the apparatus is 23% higher than that of a charge processed by the bowl type apparatus of the prior art and 28% higher than that of charge processed by the known apparatus of the rotary drum type. As a result, the specific capacity of the sintering machine has been increased by 17 per cent.

What we claim is:

1. An apparatus for mixing and granulating bulk materials, comprising: a framework; a bowl mounted on said framework for rotation about a vertical axis; a peripheral wall for said bowl, adjacent to which a material to be treated can be charged into said bowl; a bottom for said bowl having a discharge opening at the center thereof; a portion of said framework, said portion overlying said bowl; a first group of vanes, in which each vane has one end thereof adjoining the discharge opening of said bowl, the vane curving arcuately in longitudinal and transverse directions and having a side thereof, which is convex in the longitudinal direction and concave in the transverse direction, facing in a direction which is opposite to that of rotation of said bowl, the vane being mounted on said portion of said framework, overlying said bowl; a second group of vanes, in which each vane has one end thereof adjoining the peripheral wall of said bowl, the vane being defined by at least two steps curving arcuately in the transverse direction and arranged in a horizontal direction, the vane having a side thereof, which is concave in the transverse direction, facing in a direction which is opposite to that of rotation of said bowl, the vane being inclined in the direction of rotation of said bowl so that it provides an acute angle with a radius extending from the center of said bowl to the end of this stepping vane, adjoining the peripheral wall of said bowl, the vane being mounted on said portion of said framework, overlying said bowl; a discharge blade spanning jointly with such one of said stepping vanes, which is the most remote in succession in the direction of rotation of said bowl; the space between the peripheral wall of said bowl and the discharge opening in said bowl, said discharge blade being mounted on said portion of said framework, overlying said bowl; each said vane of said first group being arranged so that said vanes set as guides directing the material being treated toward the corresponding vanes of said second group, with the vanes of said second group, in turn, being arranged so that they act as guides directing the material being treated onto the successive ones of said vanes of said first group; a device for feeding a liquid binding agent into said bowl, said feeding device being mounted on said portion of said framework, overlying said bowl; and a drive to effect rotation of said bowl about the vertical axis thereof.

2. The apparatus as set forth in claim 1, in which the stepped vane, which is the most remote in the direction of rotation of said bowl from the area of charging of the material thereinto, is mounted for reciprocating in a vertical direction and a drive operably associated therewith to effect such vertical reciprocation.

3. The apparatus as set forth in claim 1, in which each of said stepped vanes extends at an angle within a range from 40° to 50° relative to the respective radius of the circle of said bowl.

4. The apparatus as set forth in claim 1, in which said discharge blade curves arcuately in longitudinal and transverse directions and has a side thereof, which is concave in the longitudinal and transverse directions, facing in a direction opposite to that of rotation of said bowl, with said discharge blade being mounted so that the clearance between a bottom edge thereof and the bottom of said bowl is minimal.

* * * * *